United States Patent [19]
Binz et al.

[11] 4,355,386
[45] Oct. 19, 1982

[54] TIME-DIVISION MULTIPLEX DIGITAL SWITCHING NETWORK FOR A PCM TELEPHONE EXCHANGE SYSTEM UTILIZING DUPLICATE CONNECTING FIELD INSTALLATIONS

[75] Inventors: Reiner Binz; Otto Karl, both of Munich, Fed. Rep. of Germany

[73] Assignee: Siemens Aktiengesellschaft, Berlin and Munich, Fed. Rep. of Germany

[21] Appl. No.: 933,412

[22] Filed: Aug. 14, 1978

[30] Foreign Application Priority Data

Aug. 22, 1977 [DE] Fed. Rep. of Germany ....... 2737713

[51] Int. Cl.³ ............................ H04J 3/06; H04J 3/14
[52] U.S. Cl. ...................................... 370/100; 370/13; 370/58
[58] Field of Search ....... 179/15 BF, 15 BS, 175.2 R, 179/175.2 C, 18 ES, 15 A; 307/64, 219

[56] References Cited

U.S. PATENT DOCUMENTS

| | | | |
|---|---|---|---|
| 3,557,315 | 11/1971 | Kobus | 179/18 ES |
| 3,725,593 | 4/1973 | Palombari | 179/15 BF |
| 3,803,568 | 4/1974 | Higashide | 307/219 |
| 4,025,874 | 5/1977 | Abbey | 307/219 |
| 4,096,396 | 1/1978 | Melindo | 307/219 |

*Primary Examiner*—Douglas W. Olms
*Attorney, Agent, or Firm*—Hill, Van Santen, Steadman, Chiara & Simpson

[57] ABSTRACT

In a time-division multiplex digital switching system as for example for PCM telephone exchange utilizing duplicate field installations, the exchange clock pulse generating arrangement is provided in duplicate for the purpose of clock pulse or frequency supply of said coupling field installations, and one arrangement is phase synchronized by the other master frequency determining unit and one exchange clock pulse generating portion supplies one coupling field half in each instance, and the other supplies the other half. The functions of the exchange clock pulse generating portions can be entirely or completely interchanged, as for example, when faults or failures appear in certain portions of the equipment.

7 Claims, 4 Drawing Figures

TIME-DIVISION MULTIPLEX DIGITAL SWITCHING NETWORK FOR A PCM TELEPHONE EXCHANGE SYSTEM UTILIZING DUPLICATE CONNECTING FIELD INSTALLATIONS

BACKGROUND OF THE INVENTION

1. Field of the Invention

This invention relates in general to time division multiplex digital switching systems, as for example, for PCM telephone exchanges utilizing two or more coupling field installations.

2. Description of the Prior Art

Recent switching technologies has led to the development of switching systems wherein the transmission of time continuous analog signals in transmission channels which are spacially separated from one another is not utilized as in conventional telephone communication systems particularly telephone exchange systems, but on the other hand, instead of space multiplex techniques, time division multiplex techniques are utilized whereby chronologically discontinuous analog or digital signals are transmitted.

In recent telecommunications systems, particularly telephone exchange systems, there has been a tendency towards centralization of the equipment and there has been a tendency towards concentration of all functions which can be together observed in a large switching center or at a few large central installations. A concentration of functions such as has occurred inevitably requires a great degree of dependability on the operability of the entire switching system, so as to assure the operability of such one or more less central installation systems, however, the possibility of failure can never be completely prevented. So as to provide for the contingency of a possible failure, installations can be provided in duplicate, whereby the respective reserve installation constantly operates in parallel with the actual operational installation and which upon failure of the operational installation can be put in operation to replace it in the train of a so-called standby or replacement apparatus. For time division multiplex switching network, it is known from the introduction of the specification of German Auslegeschrift No. 1,243,734, to provide in duplicate time-division multiplex lines connected to one another by way of a coupling field of the time division multiplex center and to provide in duplicate the coupling field of the time division multiplex switching network, so as to be able to eliminate failures on the time division multiplex line which are connected with a failure of an entire subscriber termination or connection group. It is also known from German Pat. No. 2,320,123 for bringing together the time division multiplex lines of doubly provided coupling fields of time division multiplex digital telecommunications switching networks such as PCM telephone exchange centers, to connect mutually corresponding output multiplex lines of duplicate time division multiplex networks to the two inputs of two change-over switching installations, which are respectively each connected to a switching network and the change-over switching networks respectively give priority to the time channel signals contained in their own coupling field and which are connected by way of a following common change-over switching network to the outgoing multiplex line. The common change-over switching network insures that only one of the two first change-over switching networks is operative or effective in each instance, whereby the respective coupling field operates in a master fashion, whereby the other coupling field operates in a slave fashion.

SUMMARY OF THE INVENTION

The present invention relates to a time division multiplex digital switching network, particularly PCM telephone exchanges or switching networks which utilize multiple coupling field installations which during interference-free operation operate in parallel to each other and which take-over approximately half of the traffic in each field installation. In the switching networks of this type, the problem exists, among other things, of providing a clock pulse timing supply of the duplicate coupling field installations which clock pulse timing supply is as free as possible of failures, and which is also capable of being externally synchronized. The invention solves this problem by providing an exchange clock timing pulse or frequency generating means which is provided in duplicate which supplies the switching network and the lines emanating from the switching systems with an exchange clock timing pulse or frequency, determined in bit frequency preferably in the autosynchronous mode. The clock pulse time or frequency generating arrangement can also be controlled in the servo-synchronous or master-slave modes. One of the two exchange clock pulse generating arrangements respectively supplies with an exchange clock pulse or frequency one of the two coupling field installations as well as controls the lines emanating from the switching network. The exchange clock timing pulse or frequency being produced by one exchange clock pulse generating arrangement is independent of the other clock exchange pulse generating arrangement. The second of the two clock exchange pulse or frequency generating arrangements supplies the other of such dual coupling field installations with an exchange clock pulse or frequency signal synchronized so as to be in phase with the exchange clock or pulse frequency signal supplied by the first or master exchange clock pulse or frequency generating arrangement.

The present invention provides the advantage in that the exchange clock timing pulses or frequencies generated in the two exchange clock pulse or frequency generators are connected by a phase-locked loop such that pursuant to the bringing together at the output of the bit currents connected by way of the two coupling field half installations, only negligibly small phase difference will occur between both of the bit currents and pursuant to a reciprocal change-over switching of the exchange clock or frequency generating arrangements which have previously had one of the exchange clock timing pulse or frequency generating arrangements operating as the master generator is converted so that it operates in a slaved fashion from the second clock pulse or frequency generating arrangement, there will occur at the most a very small phase shift which leaves unimpaired the synchronism of line clock regenerators repeaters mounted in the lines emanating from the switching systems. Simultaneously, there is the possibility in the case of failure or interference, or for example when the maintenance is required, to avoid impermissible phase shifts and of also providing subsequent to a corresponding substitution or replacement switching that both coupling field portions can be provided with clock pulses from one single exchange clock or frequency pulse generating switching network. A further provision of the invention allows the individual coupling field pairs to be connected by way of change-over switching networks upon the failure of one of the exchange clock pulse or frequency generators to be connected to the other one without having phase shifts and maintaining the phase synchronization in the respective coupling field installations by connecting both of the coupling field arrangements to the independently generated exchange clock pulse or frequency generator.

Yet another development of the invention provides that the exchange clock pulse or frequency oscillator or generator of an exchange clock pulse or frequency generating arrangement can be mounted in a phase or regulating control phase-locked loop preferably of the third order which is subjected to control from the exchange clock pulse or frequency signal provided by the other exchange clock pulse or frequency oscillator and which is separable by means of switching networks which are in series with the control input of the exchange clock pulse or frequency oscillator, whereby the switch can be formed by switching path of a change-over switch whose other switching path lies in a phase-locked loop preferably of the second order, containing the exchange clock pulse or frequency oscillator and which can be connected to receive clock pulses originating on incoming lines of the switching network and/or are being controlled by a master clock pulse or frequency generator. In this manner in a particularly simple fashion a phase fixed synchronized clock pulse or frequency generation and a possibility of change-over switching of the exchange clock pulse or frequency generating apparatus is rendered possible, such that when one of the exchange clock pulse generators which had been operating as a master oscillator is converted so that it operates in a slave fashion and conversely, the prior slave oscillator is converted into a master oscillator, and whereafter a failure of a phase-locked loop in one or more of the oscillators switching arrangements can occur which will alleviate such failure so that two phase identical clock pulses continued to be supplied to both of the coupling field installations.

Other objects, features and advantages of the invention will be readily apparent from the following description of certain preferred embodiments thereof taken in conjunction with the accompanying drawings, although variations and modifications may be effected without departing from the spirit and scope of the novel concepts of the disclosure and in which:

DESCRIPTION OF THE PREFERRED EMBODIMENTS

Figure 1:
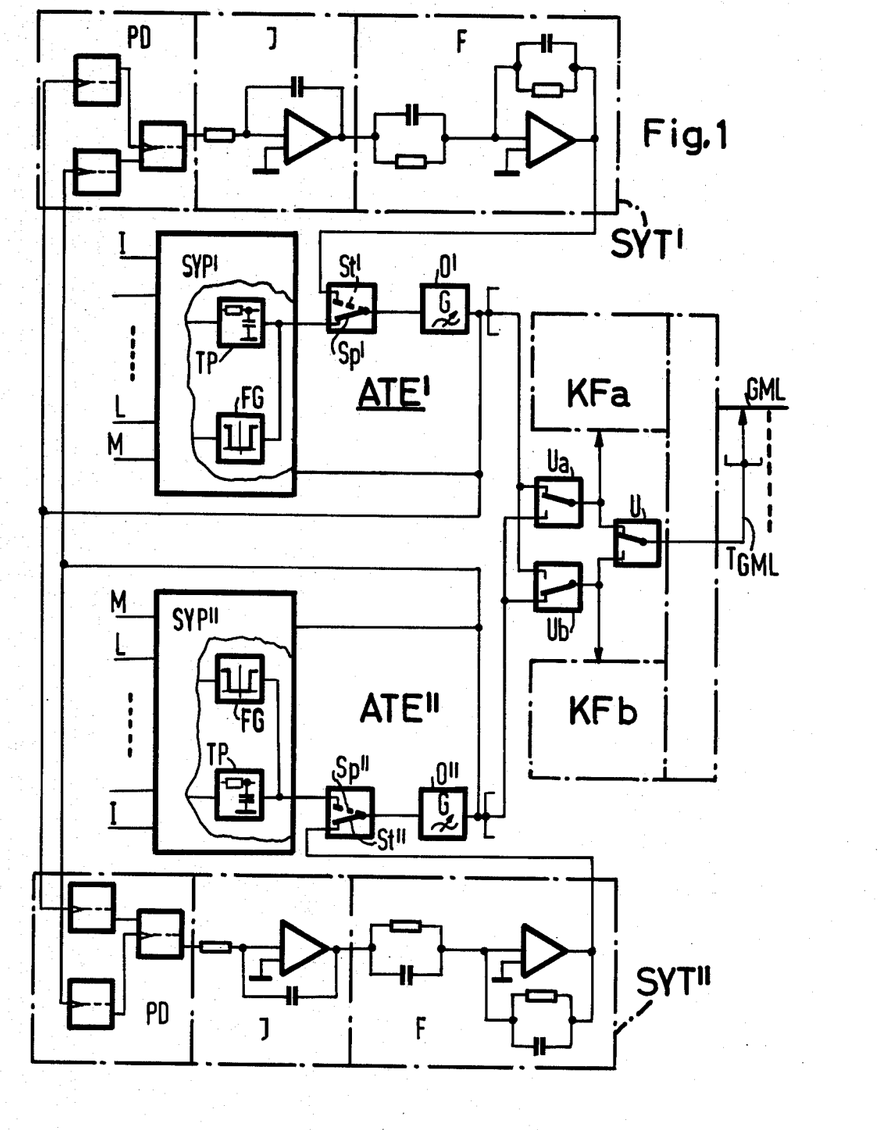
FIG. 1 is an electrical schematic view of the time division multiplex digital switching network of the invention.
Figure 2:
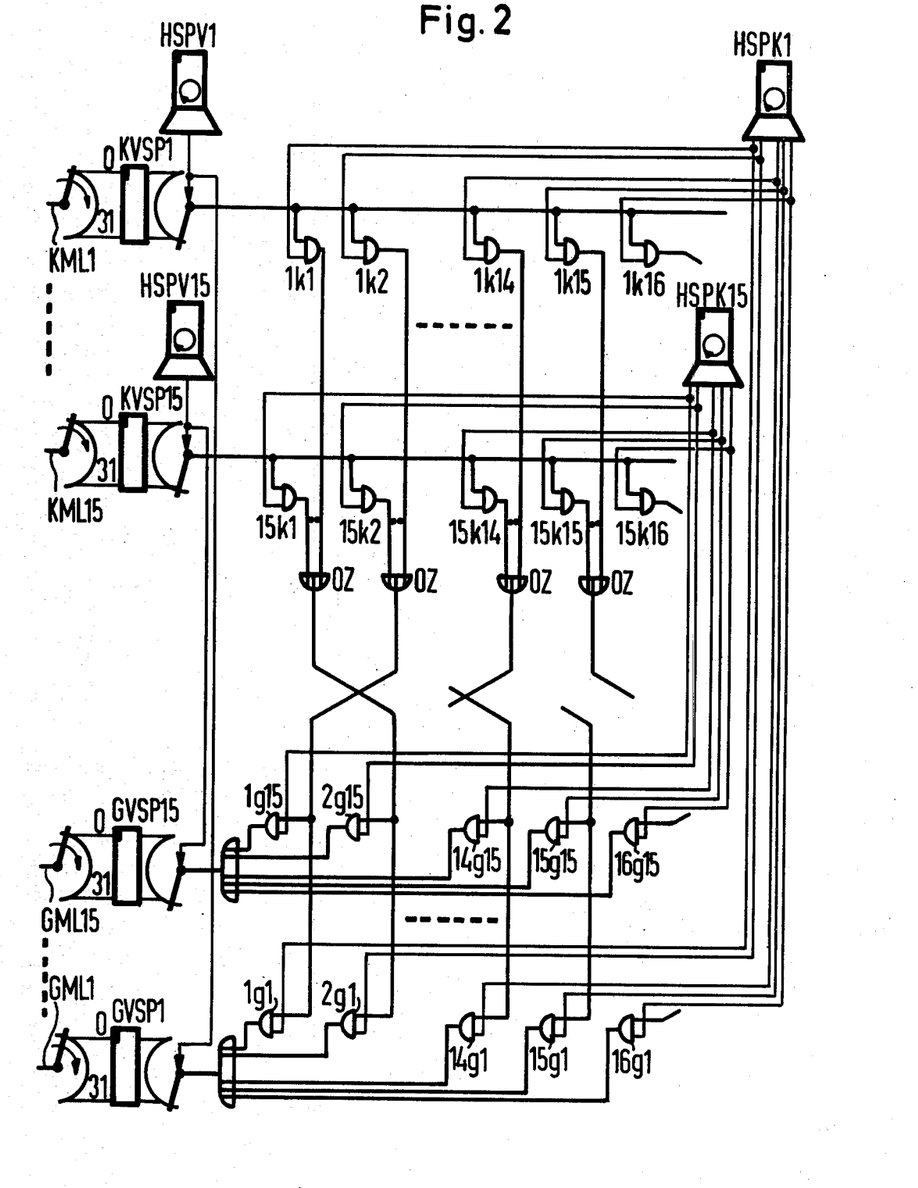
FIG. 2 is an electrical schematic view of the coupling field time division multiplex digital system.
Figure 3:
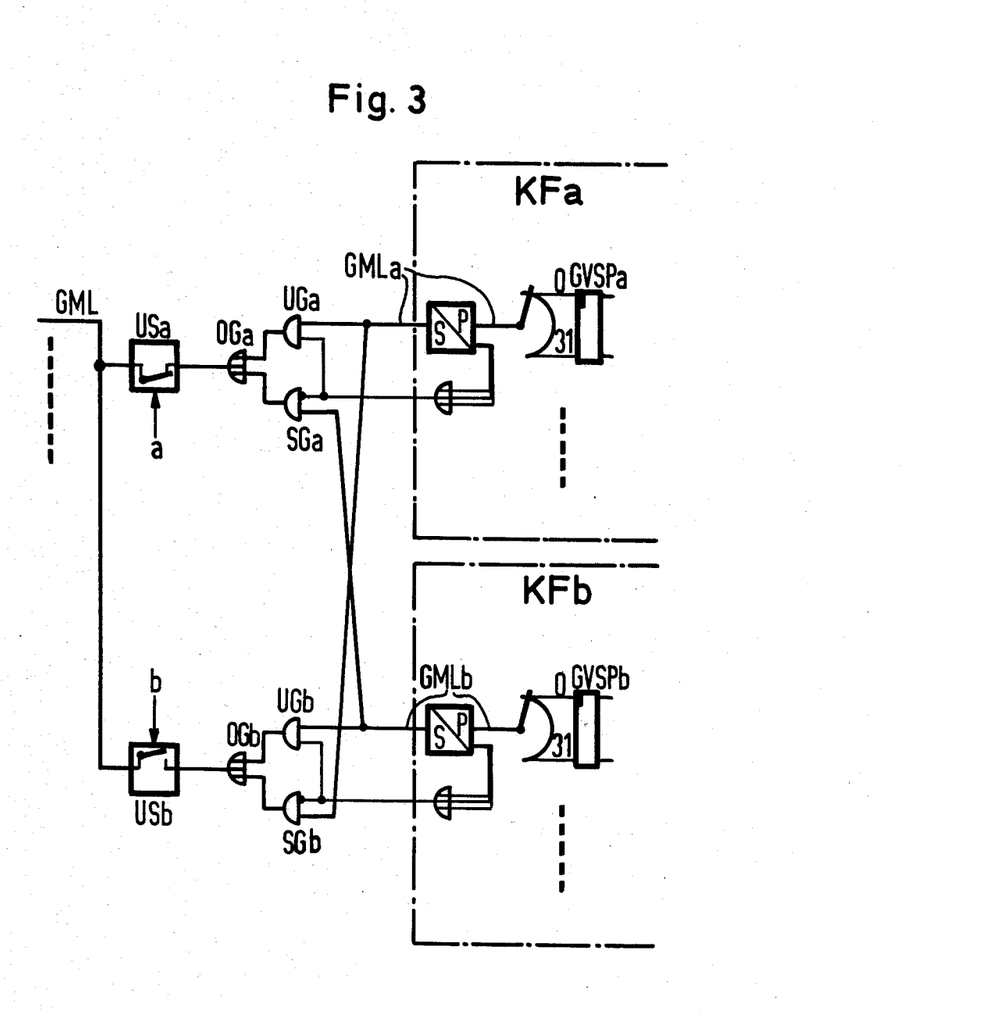
FIG. 3 illustrates the electrical schematic of bringing together the mutually corresponding output time division multiplex lines of the coupling fields provided in duplicate.

The sample embodiment illustrated in FIG. 1 of a time division multiplex digital switching network illustrating the invention as applied particularly to a PCM telephone exchange utilizes coupling fields provided in pairs of which two such coupling fields KFa, KFb, are illustrated in FIG. 1, which during interference-free operation operate in parallel to each other and thus each assumes approximately one-half of the respective traffic flow. Each of these coupling fields can be constructed such as illustrated in FIG. 2. FIG. 3 illustrates how the outside connections of the two coupling field halves indicated in FIG. 1 can be constructed. For this reason, FIGS. 2 and 3 will be first described.

FIG. 2 illustrates a switching network of a PCM time division multiplex switching network which is known per se as shown for example in FIG. 1 of German Pat. No. 2,320,123, wherein 15 time division multiplex lines operated in the four-wire mode, each of which comprise an incoming time division multiplex line $KML1$.. . $KML15$ and an outgoing time division multiplex line $GML1$ . . . $GML15$ are capable of being connected with one another and with other time division multiplex lines operated in the four-wire mode. The incoming time division multiplex lines $KML1$ . . . $KML15$ which are connected through a time coupling stage in the form of a time division multiplex line individual full storage means $KVSP1$ . . . $KVSP15$, are capable of pair-wise connection by way of time division multiplex intermediate line pairs to the outgoing time division multiplex lines $GML1$ . . . $GML15$ which also run by way of a time coupling stage with time division multiplex line individual full storage means $GVSP1$ . . . $GVSP15$, through coupling point switches $1k1$, $1k2$ . . . $1k14$; $1g1$, $2g1$, . . . $14g1$; . . . ; $1g15$, $2g15$ . . . $14g15$. The intermediate line side connections of the coupling point switches $1k1$ . . . $15k1$; $1k2$ . . . $15k2$; . . . ; $1k15$ . . . $15k15$, leading from the incoming time division multiplex lines $KML1$ . . . $KML15$ to one and the same intermediate line are integrated together by OR member OZ. In FIG. 2, it is indicated that the individual time division multiplex lines of the group of time division multiplex lines operated in the four-wire mode are also capable of connection by way of additional coupling point switches $1k15$ . . . $15k15$; $1g15$ . . . $15g15$ to intermediate lines which lead to other groups of time division multiplex lines operated in the four-wire mode. Also individual time division multiplex lines can be connected to a time division multiplex line individual identification processing installation such as discussed in German Auslegeschrift No. 2,105,745 by way of coupling point switches $1k16$ . . . $15k16$; $16g1$ . . . $16g15$.

The time division multiplex line individual full storage means $KVSP1$, $GVSP1$; . . . ; $KVSP15$, $GVSP15$, are selected to be on the side not facing the switching center, in a known manner, cyclically in the clock pulse rhythm of the PCM-words transmitted on the particular time division multiplex line such that the respective time division multiplex line in each channel is connected to the time channel individual storage location of the full storage means. In FIG. 2 it is indicated that the full storage means as storage locations $0$ . . . $31$, respectively, corresponding to 32 time channels in the path frame. At the switching center side, the two full storages $KVSP1$, $GVSP1$; . . . ; $KVSP15$, $GVSP15$ of the individual time division multiplex lines $KML1$, $GML1$; . . . ; $KML15$, GML15 are capable of being selected by address from a time division multiplex line individual control memory means HSPV1 . . . HSPV15, such that the individual PCM-words in the switching network can be further transmitted in time channels differing from the time channels occupied by the signal paths. So as to actuate or select those particular coupling point switches which are connected to one and the same incoming time division multiplex line and so as to select those particular coupling point switches which are connected to the respective outgoing time division multiplex lines, a common address circulating storage is provided. Thus an address circulating storage HSPK1 is provided for selection of the coupling point switches $1k1 \ldots 1k16$ and $1g1 \ldots 16g1$, and an address circulating storage HSPK15 is provided for the selection of the coupling point switches $15k1 \ldots 15k16$ and $1g15 \ldots 16g15$. There is connected to the output side of each address circulating memory HSPK1 . . . HSPK15 in a fashion which is known per se, a decoder whose outputs lead to the control inputs of the coupling point switches by way of which the respective time division multiplex lines are capable of connection to the individual time division multiplex intermediate lines. In a corresponding manner, decoders are also connected to the output side of the retaining storage means HSPV1 . . . HSPV15 whose outputs lead to the actuating selection control inputs of the individual storage places of the respective full storage means KVSP1, GVSP1; . . . ; KVSP15, GVSP15, which is generally indicated in FIG. 2.

FIG. 3 illustrates how mutually corresponding outgoing time division multiplex lines of switching networks provided in duplicate can be connected together in a fashion which is known per se as illustrated in FIG. 2 of German Pat. No. 2,320,123. The switching network KFa comprises one of the switching network and the other switching network is designated KFb. Each of these two switching networks can be constructed in a manner as illustrated in FIG. 2 and FIG. 3 primarily illustrates the time division multiplex line GMLa emanating from switching network KFa with the pertinent full storage means GVSPa and the corresponding outgoing time-division multiplex line GMLb with the pertinent full storage means GVSPb of the switch network KFb illustrated. FIG. 3 additionally indicates that there is mounted in the outgoing time division multiplex line GMAa and GMLb a parallel series converter respectively. For each of the outgoing time division multiplex lines GMLa of the switching network KFa and for each outgoing time division multiplex line GMLb of switching network KFb there is provided a change-over switch arrangement in the form of an AND gate UGa or UGb, respectively, and inhibition gate SGa or SGb, respectively, which are combined at the output side by way of an OR gate, OGa or OGb, respectively. The AND gates UGa or UGb, respectively, is then unblocked with one input to all time channels occupied on the respective outgoing time division multiplex line GMLa or GMLb; and the inhibition gate SGa or SGb respectively on its blocking input is blocked to all time channels occupied on the respective outgoing time division multiplex line GMLa or GMLb. In FIG. 3 it is indicated that this can occur with the aid of an OR gate connected to the respective inputs of the two combinational logic elements, said OR-gate being connected at its input side to the parallel series converter inserted in the respective outgoing time division multiplex line: therefore each OR gate in each time division time slot to which, in the parallel series converter, there is allocated a bit group containing at least one bit "1" delivers an output signal unblocking the respective AND gate UG and blocking the respective inhibition gate SG. The pertinent outgoing time division multiplex line GMLa, or GMLb, respectively, leads to the other input of the pertinent AND gate UGa or UGb, respectively, whereas the corresponding outgoing time division multiplex line GMLb or GMLa, respectively, of the other switching network KFb or KFa, respectively, leads to the other input of the pertinent inhibition gate SGa or SGb, respectively. The two OR gates OGa and OGb of the two mutually corresponding outgoing time division multiplex lines GMLa and GMLb of the two switching networks KFa and KFb are connected to the inputs of an additional change-over switching arrangement, USa and USb and to the output of which the pertinent time division multiplex line GML which supplies the output from the respective switching center is connected. The change-over switching installation USa and USb can be formed by means of two line transmission or amplifier stages of which only one stage is capable of transmission in each instance according to control signals supplied to them at control inputs a or b, respectively.

Thus, by way of control signals, the one of the two stages of the change-over switching networks USa and USb is rendered semipermanently into a transmissive condition, and the other is blocked. The bit-groups occurring on the two mutually corresponding outgoing time division multiplex lines GMKa and GMKb of the two switching networks KFa and KFb, are available respectively, at the inputs of both change-over switching networks associated with the two outgoing time division multiplex lines GMLa and GMLb at the inputs of both combinations of the combinational logic elements UGa, SGa, OGa, or UGb, SGb, OGb, respectively, whereby each combination of combinational logic elements provides priority to the time channels of its own switching network which are communicated to it as occupied, while in the case of a possible simultaneous occurrence of one bit group in each instance at the input of the AND gate (e.g. UGa) and of the inhibition gate (SGa), it further transmits the bit group occurring at the input of the AND gate originating from its own switching network (e.g. KFa); but blocks the other bit group originating from the other switching network (e.g. KFb).

Figure 4:
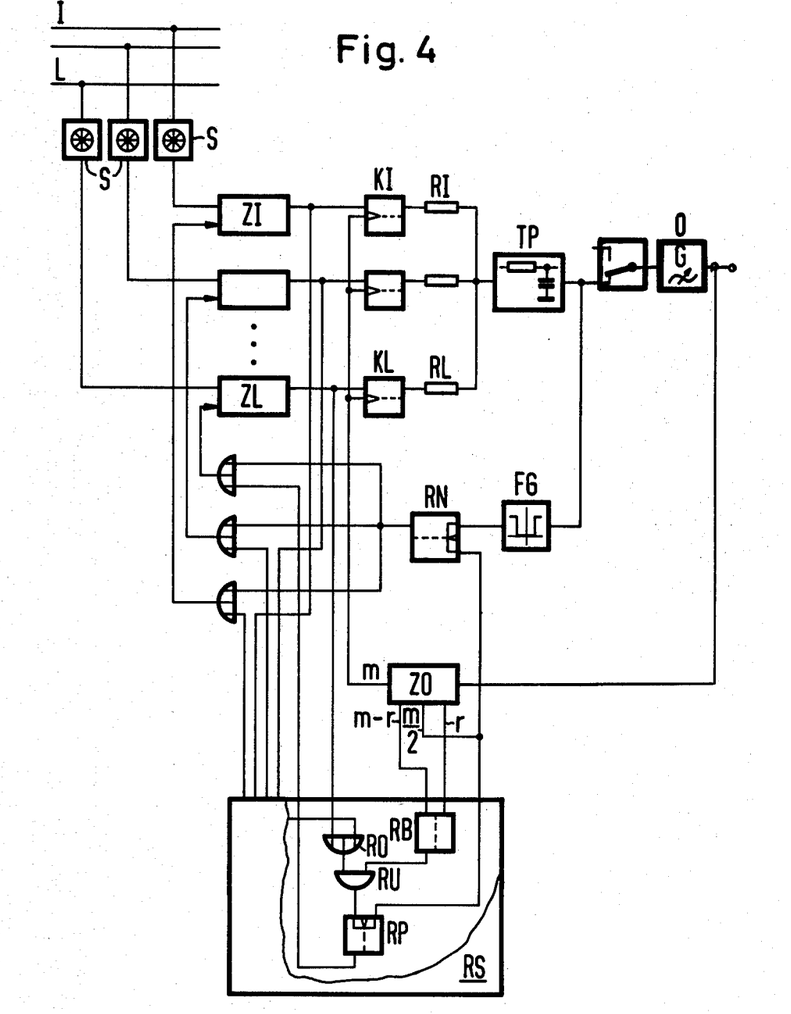
FIG. 4 illustrates a phase-locked loop of the type described in U.S. Pat. No. 4,002,839 which illustrates a phase-locked loop operating according to the phase averaging principle.

Referring to FIG. 1 in the time division multiplex digital switching network illustrated, an exchange clock pulse or frequency time generating system supplies with clock pulses the switching network and the lines emanating from the switching network such as the outgoing time division multiplex line GML, is provided according to the invention with duplicate exchange clock pulse frequency installations, which are referred to in the drawing as ATE' and ATE". Each of the two exchange clock pulse or frequency installations ATE', and ATE", in addition to the actual exchange clock pulse oscillator O' or O", also includes a synchronization installation SYP' and SYP", respectively, and an additional synchronization installation SYT' and SYT". The exchange clock pulse oscillator O' of the exchange clock pulse or frequency arrangement ATE' is mounted by way of the switching path Sp' of a change-over switch Sp'/St', in a phase control loop SYP' - Sp' - O', which contains the synchronization installation SYP', which is subjected in the case of autosynchronization, to line clock-pulses of incoming lines I . . . L, of the switching system and/or in the case of servosynchronization, are subjected to the output from a higher ranking master oscillator disposed in a higher network hierarchy plane, such as a master clock pulse supplied on the line M. A phase-locked control loop of this type, which is illustrated in further detail in FIG. 4, is known in circuit construction as well as its mode of operation from U.S. Pat. No. 4,002,839 of which description and specification is hereby incorporated by reference. See also in the publication "Funkschau" 49 (1977) 3,-119 . . . 122 and 5,203 . . . 204. In the sample embodiment of FIG. 1, an exchange clock pulse oscillator O', together with the synchronization installation SYP', which includes among other elements, a low pass filter circuit TP and a threshold circuit FG, forms a synchronization circuit in the form of a phase-locked loop of the second order, such as is known which operates according to the phase-averaging principle. This synchronization circuit SYP' - Sp' - O' of the exchange clock pulse or frequency generating arrangement ATE', supplies the one particular coupling field installation KFa of the dual provided coupling field installations KFa, KFb, as well as through the change-over switch installation U and the subsequently following clock pulse line $T_{GML}$, it supplies the line terminals of the lines emanating from the switching network such as indicated in FIG. 1 from an outgoing time division multiplex line GML with an exchange clock pulse or frequency determined in bit frequency in the autosynchronous mode and/or in the servosynchronous or master-slave mode, and such exchange clock pulse is generated independently of the other exchange clock pulse or frequency generating apparatus ATE".

The exchange clock pulse oscillator O" of the other exchange clock pulse or frequency generating apparatus ATE" on the other hand, supplies the other particular switching network KFb of the dual provided switching network installations KFa or KFb with an exchange clock pulse or frequency signal which is synchronized so as to be identical in phase with the exchange clock pulse or frequency signal supplied by the first exchange clock pulse or frequency generating apparatus ATE'. For this purpose, in FIG. 1 the exchange clock pulse oscillator O" of the exchange clock pulse or frequency generating apparatus AET" is connectable by way of the switching path St"/Sp" in a phase-locked loop SYT"- St" - O", containing the synchronization installation SYT", which receives the exchange clock pulse from the exchange clock oscillator O' of the first exchange clock pulse or frequency generating apparatus ATE', such that according to FIG. 1 a phase-locked loop of the third order is provided. In the sample embodiment according to FIG. 1, such a phase-locked loop of the third order consists essentially of a phase demodulator PD, which is provided with clock pulse frequency dividers delivering two input signals which are phase displaced by a 180 degrees. In addition, an integrator J receives the output of the phase modulator PD and a lag-lead-filter F receives the output of the integrator J. The lag-lead-filter F provides stability and expediently, the time constant of the input element is greater than that of the counter coupling element, as well as essentially consisting of the actual oscillator and thus the phase-locked loop of the third order produces in comparison with the phase-locked loop of the second order, an expanded or enlarged filter, such that the transfer function manifests an additional pole, which as is known, has the advantage that control or regulating errors can thereby be cancelled. See for example, the publication "Nachrichtentechnik Elektronik" 25 (1975) 8, 296, 298. In other words, the frequency deviations of an oscillator which can occur, for example, due to aging can be substantially eliminated or controlled without phase deviations. The phase-locked loop contained in the synchronization installation SYT can be realized preferably using third order techniques, but it can also be realized in other manners which are different from the sample embodiment illustrated in FIG. 1.

It can be seen from the above description and explanation, that with the solid line positions of the change-over switches Sp'/St' and St"/Sp", illustrated in FIG. 1, that the change-over clock pulse or frequency generating arrangement ATE' delivers an exchange clock pulse or frequency signal which is controlled in its bit frequency by an autosynchronous PCM network (I . . . L), and/or by a master clock pulse oscillator which supplies an input to terminal M respectively, and which exchange clock pulse or frequency signal is generated independently of the exchange clock pulse or frequency generating arrangement of ATE" and the exchange clock pulse or frequency generating apparatus ATE" supplies an exchange clock pulse or frequency signal which is synchronized and phase locked with the exchange clock pulse supplied by the exchange clock pulse or frequency generating apparatus ATE'. It should be noted that the operating range of the synchronization unit SYT" of the exchange clock pulse or frequency generating apparatus ATE" controlled by the exchange clock pulse or frequency generating arrangement ATE', is greater than the working range of the synchronization SYP' of the master exchange clock pulse or frequency generating apparatus ATE' so that a sure intercept and capture of the signal is assured and the time constant of the synchronization illustration SYT" of the controlled exchange clock pulse or frequency generating apparatus ATE" is smaller than the time constant of the synchronization installation SYP' of the master exchange clock pulse or frequency generating apparatus ATE' whereby, in the case of a possible drift of the clock pulse frequency of the exchange clock pulse oscillator O' controlled by the synchronization installation SYP', a rapid follow-up of the synchronization installation SYT" and hence of the exchange clock pulse oscillator O" which is controlled by the synchronization unit of the control exchange clock pulse or frequency generating apparatus ATE" is possible. It should be noted, that in deviation of conditions described above, the master exchange clock pulse or frequency generating apparatus ATE' can possibly also operate in an entirely autonomous fashion i.e., asynchronously in relation to any path or master clock pulses.

If the two change-over switches Sp'/St', St"/Sp" illustrated in FIG. 1 are switched over to the dotted line positions in FIG. 1, the two exchange clock pulse or frequency generating apparatuses ATE' and ATE" exchange their functions, and the exchange clock oscillators O' of the exchange clock pulse or frequency generating apparatus ATE' will then be mounted in a phase-locked loop containing the synchronization installation SYT', constructed corresponding to the synchronization installation SYT", and which the synchronization installation SYT' is subjected to the exchange clock pulse or frequency of the exchange clock pulse or frequency generating apparatus ATE" and the exchange clock pulse oscillator O" of the exchange clock pulse or frequency generating apparatus ATE" becomes mounted in a phase-locked loop containing the synchronization installation SYP", constructed in the same manner as synchronization installation loop SYP'. Such phase-locked loop is subjected to line clock pulses originating on incoming lines I . . . L of the switching system, and/or is subjected to a master clock pulse occurring on a line M. Thus, as contrasted with the prior connection conditions, the exchange clock pulse or frequency generating apparatus ATE" then operates as the master exchange clock pulse or frequency generating arrangement from which the exchange clock pulse or frequency generating apparatus ATE' is controlled.

Through a corresponding actuation of change-over switches Sp'/St' and St"/Sp", it is thus possible to overcome a possible failure of a synchronization installation, such as SYP or SYT, which previously were included in the phase-locked loop while maintaining the phase identity interaction of both exchange clock pulse or frequency generating apparatusses ATE' and ATE". This can be accomplished after a failure of the phase-locked loop which received the exchange clock pulse of the exchange clock pulse oscillator of the particular other exchange clock pulse generating arrangement of the slave exchange clock pulse generating arrangement so that the roles are reversed and the slave exchange clock pulse generating apparatus, after failure, becomes the master clock pulse generating apparatus and by switching over by way of the respective change-over switches St"/Sp", Sp'St', the pertinent exchange clock pulse oscillator into the other phase-locked loop, respectively.

The exchange clock pulse frequencies generated by the two exchange clock pulse or frequency generating apparatus ATE' and ATE" are supplied from their exchange clock pulse oscillators O', or O", which can also be provided with clock pulse forming elements for the purposes of reforming sine wave pulses into rectangular or square wave pulses and, if necessary, can be provided with their own clock pulse driving units and are then supplied to the individual switching networks, such as KFa, KFb, of the switching network installations by way of change-over switch installation Ub, Ua, by way of which each exchange clock pulse oscillator O', O" is capable of connection to each switching network installation KFa, KFb, and it is also indicated in FIG. 1 that normally the one exchange clock pulse oscillator O' is connected to the particular one switching network installation KFa, and the other exchange clock pulse oscillator O" normally connects to the particular other switching network installation KFb of the doubly provided switching network installations. After a failure of the exchange clock pulse or frequency of the controlled exchange clock pulse or frequency generating installation ATE", which might be caused, for example, through failure of the voltage supply of the exchange clock pulse or frequency installation ATE", or also due to an intended disconnection of the controlled exchange clock pulse or frequency generating installation ATE", the independently generated exchange clock pulse or frequency signal of the master clock pulse or frequency generating apparatus ATE' can be connected directly by way of the change-over switch Ub to the switching network installation KFb so that the apparatus can continue to operate with the one timing generator.

Although this invention has been described with respect to preferred embodiments, it is not to be so limited that changes and modifications may be made therein which are within the full intended scope of the invention as defined by the appended claims.

We claim as our invention:

1. A time-division multiplex digital switching system, particularly a PCM-telephone exchange system comprising switching network installations (KFa, KFb) provided in duplicate operating in parallel with one another for interference-free operation, and each assuming approximately half the traffic flow, respectively, characterized in that there is provided, in duplicate, exchange clock pulse frequency generating apparatus ATE (ATE', ATE") supplying the switching networks (KFa, KFb) and the lines emanating from the latter with an exchange clock pulse determined in bit-frequency, whereby the particular one of the two exchange clock pulse frequency generating apparatuses ATE', supplies the particular one of such doubly-provided switching network installation (KFa), as well as the line (GML) from the exchange system, with an exchange clock pulse generated by it independently of the particular other exchange clock pulse apparatus (ATE"), and whereby the particular other of the two exchange clock pulse generating apparatuses (ATE") supplies the other of such doubly-provided switching network installations (KFb) with an exchange clock pulse which is phase-locked with the exchange clock pulse supplied by the exchange clock pulse from generating apparatus (ATE').

2. A time-division multiplex digital switching system according to claim 1, characterized in that there are supplied, to one of the switching network installation pairs (KFb, KFa), the exchange clock pulses of both exchange clock pulse generating apparatuses (ATE", ATE') through a change-over switch installation (Ub; Ua), so that subsequent to failure of the phase-locked loop clock pulse previously connected to the respective switching network installation (KFb; KFa), the independently generated exchange clock pulse can be connected to a switching network installation (KFb; KFa).

3. A time-division multiplex digital switching system according to claim 2, characterized in that the exchange clock pulse oscillator (O"; O') of an exchange clock pulse apparatus (ATE"; ATE') is mounted in a phase-locked loop (SYT", St", O"; SYT', St', O') controlled by the exchange clock pulse oscillator (O'; O") of the other exchange clock pulse generating apparatus (ATE'; ATE") with its exchange clock pulse output, said phase-locked loop being separable by means of a switch (St", St'), series-connected to the control input of the exchange clock pulse oscillator (O", O').

4. A time-division multiplex digital switching system according to claim 3, including a phase-locked loop of the third order (SYT', St', O'; SYT", St", O").

5. A time-division multiplex digital switching system according to claim 3, characterized in that the switch (St', St") is formed by one switching path (St', St") of a change-over switch (Sp'/St'; St"/Sp"), which has the other switching path (Sp', Sp") connected in a phase-locked loop (SYP', Sp', O'; SYP", Sp", O"), containing the exchange clock pulse oscillator (O', O") and being controlled by line clock-pulses supplied on incoming lines (I . . . L) of the switching system, and/or being subjected to a master clock pulse, (M).

6. A time-division multiplex digital switching system according to claim 5, including a phase-locked loop of the second order (SYP', Sp', O'; SYP", Sp", O").

7. A time-division multiplex digital switching system according to claim 5, characterized in that, after a failure of the phase-locked loop (SYT", St", O") of the exchange clock pulse generating apparatus (ATE"), delivering the phase-locked exchange clock pulse, said phase-locked loop (SYT", St", O") being supplied by the exchange clock pulse oscillator (O') of the particular other exchange clock pulse generating apparatus (ATE') with its exchange clock pulse, and/or subsequent to a failure of the phase-locked loop (SYP', Sp', O') being subjected to line-clock-pulses (I . . . L) and/or a master clock pulse (or frequency) (M) of the exchange clock pulse generating apparatus (ATE') delivering the independently generated exchange clock pulses, the respective exchange clock pulse oscillator (O"; O') is capable of being switched over, via the respective change-over switch (St"/Sp"; Sp'/St') into the respectively other phase-locked loop (SYP", Sp", O"; SYT', St', O').

* * * * *